(12) United States Patent
Baar, III

(10) Patent No.: US 12,741,706 B2
(45) Date of Patent: Sep. 22, 2026

(54) BUSHINGLESS TRACK PIN FOR A TRACK TYPE VEHICLE

(71) Applicant: Caterpillar Inc., Peoria, IL (US)

(72) Inventor: William Henry Baar, III, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 692 days.

(21) Appl. No.: 18/068,227

(22) Filed: Dec. 19, 2022

(65) Prior Publication Data

US 2024/0199148 A1 Jun. 20, 2024

(51) Int. Cl.

*B62D 55/21* (2006.01)
*B32B 7/022* (2019.01)
*B32B 15/01* (2006.01)
*B62D 55/088* (2006.01)
*C21D 1/18* (2006.01)
*C21D 9/00* (2006.01)

(52) U.S. Cl.

CPC .............. *B62D 55/21* (2013.01); *B32B 7/022* (2019.01); *B32B 15/011* (2013.01); *B62D 55/088* (2013.01); *C21D 1/18* (2013.01); *C21D 9/0068* (2013.01); *B32B 2307/536* (2013.01); *B32B 2307/732* (2013.01); *C21D 2211/008* (2013.01)

(58) Field of Classification Search

CPC ....... B62D 55/21; B32B 15/011; B32B 7/022; B32B 2307/536; C21D 9/0075; C21D 1/06; C21D 2221/10

See application file for complete search history.

(56) References Cited

U.S. PATENT DOCUMENTS

| | | | | |
|---|---|---|---|---|
| 4,150,856 | A * | 4/1979 | Hakkenberg | B62D 55/205 305/117 |
| 9,302,722 | B2 | 4/2016 | Liang et al. | |
| 9,623,921 | B2 | 4/2017 | Woodrich | |
| 10,351,186 | B1 | 7/2019 | Fischer et al. | |
| 2006/0181151 | A1 | 8/2006 | Wodrich et al. | |
| 2014/0216613 | A1* | 8/2014 | Xue | C21D 9/0068 148/575 |
| 2018/0320244 | A1 | 11/2018 | Rathod et al. | |
| 2021/0095355 | A1* | 4/2021 | Rathod | C22C 38/00 |
| 2021/0101651 | A1 | 4/2021 | Rathod et al. | |
| 2021/0179212 | A1* | 6/2021 | Baar | B62D 55/08 |
| 2022/0185399 | A1 | 6/2022 | Grenzi et al. | |

FOREIGN PATENT DOCUMENTS

| | | | | |
|---|---|---|---|---|
| CN | 113371087 | A | | 9/2021 |
| CN | 113443035 | A | | 9/2021 |
| JP | 2007084917 | | | 4/2007 |
| RU | 183776 | U1 | * | 10/2018 |

* cited by examiner

*Primary Examiner* — S. Joseph Morano
*Assistant Examiner* — Alex Palmer

(57) ABSTRACT

A bushingless track pin is disclosed. The track pin includes a hardened outer layer and a relatively softer inner core. The track pin may be formed using high carbon steel, which in some cases may be substantially spheroidal martensite crystal structure. A track pin may be formed using the high carbon steel, followed by a hardening process. In some examples, an optional induction hardening process may thereafter be performed on the inner surface most proximal to the central hole of the track pin if needed. The hardening on the inner surface may harden the outer portion while tempering the core portion of the track pin.

18 Claims, 4 Drawing Sheets

BUSHINGLESS TRACK PIN FOR A TRACK TYPE VEHICLE

TECHNICAL FIELD

An endless track chain for a track type vehicle is disclosed, and, more particularly, a bushingless track pin for connecting links of a track assembly is disclosed.

BACKGROUND

Track-type machines are in widespread use in construction, mining, forestry, and other similar industries. To provide ground-engaging propulsion, the undercarriage of such track-type machines utilizes track assemblies rather than wheels. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, drive sprockets, idlers, tensioners, and rollers, for example. Typical track chain assembly designs include a track pin either fixedly or rotatably connected to a pair of chain links and a bushing rotatably positioned between the links and about the track pin. During operation, the track bushing may experience excessive loading, impingement of sprocket teeth, and debris from the environment.

In use, the track bushing may not provide sufficient wear resistance and toughness and may experience a structural failure, causing parts of the bushing to fall off and potentially create additional issues. Further, being separate components, load stresses may not readily be absorbed across the entire bushing/pin structure and may be localized at an interface between the two. Some efforts have been made to attempt to extend the working life of these track bushings. For example, U.S. Pat. No. 9,623,921 to Wodrich (hereinafter "the '921 patent) describes the use of a "wear-resistant coating." The '921 patent describes a wear-resistant coating that is metallurgically bonded to an outer surface of a bushing. However, the wear-resistant coating does not solve issues relating to the absorption of load stresses and parts of the bushing falling off after a structure failure.

Examples of the present disclosure are directed to overcoming deficiencies of such systems.

SUMMARY

In one aspect of the presently disclosed subject matter, a track chain assembly includes a first link and a second link, and a track pin joining the first link to the second link, the track pin comprising, a first layer having a thickness up to 10 mm, the first layer having a first hardness within an HRC range from 50 HRC to 70 HRC, and a second layer having a second hardness with a second hardness less than the first hardness.

In another aspect of the presently disclosed subject matter, a method for producing a track pin includes forming the track pin using a high carbon steel, and differentially hardening the track pin to form a first layer having a thickness up to 10 mm, the first layer having a first hardness within an HRC range from 50 HRC to 70 HRC, and a second layer having a second hardness with a second hardness less than the first hardness.

In a still further aspect of the presently disclosed subject matter, a track pin includes a first layer having a thickness up to 10 mm, the first layer having a first hardness within an HRC range from 50 HRC to 70 HRC, and a second layer having a second hardness with a second hardness less than the first hardness.

DETAILED DESCRIPTION

Wherever possible, the same reference numbers will be used throughout the drawings to refer to the same or like parts.

Figure 1:
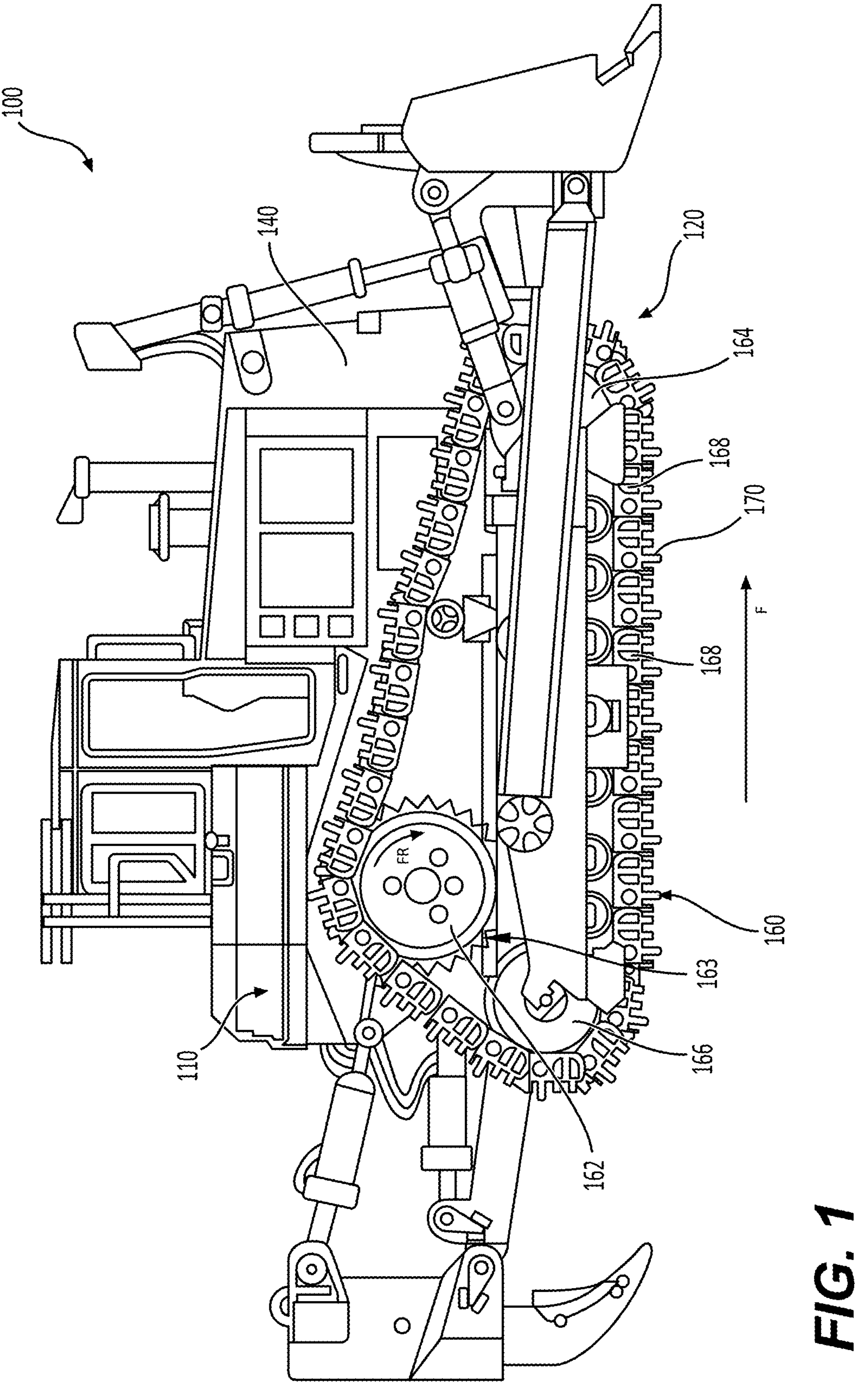
FIG. 1 is a schematic illustration of a system as an example track-type machine with one or more components formed in accordance with example embodiments of the disclosure.

Turning now to the figures, FIG. 1 is a schematic illustration of a track-type machine 100 with one or more components formed in accordance with example embodiments of the disclosure. The example embodiment of the machine 100 includes a track-type undercarriage 120. The machine 100 may also be referenced herein interchangeably as a track-type machine 100 and/or machine 100. In other embodiments, the machine 100 may be any suitable machine with a track-type undercarriage 120, such as, a dozer, loader, excavator, tank, backhoe, drilling machine, trencher, or any other on-highway or off-highway vehicle.

The machine 100 includes a frame 140 having a first track chain assembly 160 disposed on a first side 110 thereof, and a second track chain assembly (not shown) disposed on a second side (not shown) thereof. The second side is in opposing relationship to the first side 110. Together, the track assemblies are adapted to engage the ground, or other surface, to propel the machine 100 in a backward and/or forward direction.

It should be appreciated that the track chain assemblies of the machine 100 may be similar and, further, may represent mirror images of one another. As such, only the first track chain assembly 160 will be described herein. It should be understood that the description of the first track chain assembly 160 may be applicable to any number of second track chain assemblies, as well. Other embodiments, in accordance with the disclosure, may include more than two track chain assemblies. Thus, the apparatus, systems, and methods, as disclosed herein, apply to any suitable track-type machine, or variations thereof. Additionally, the disclosed components of the track-type machine 100 and the mechanism of formation thereof, as discussed herein, may also apply to other systems, such as non-track type machines and/or other mechanical systems. While the machine 100 is illustrated in the context of a track-type machine, it should be appreciated that the present disclosure is not thereby limited, and that a wide variety of other machines having tracks are also contemplated within the present context. For example, in other embodiments, the track chain assembly 160 can be included in a conveyor system, as a track for transmitting torque between rotating elements, or in any other application known to those skilled in the art.

Returning to FIG. 1, the first track chain assembly 160 extends about a plurality of rolling elements such as a drive sprocket 162, a front idler 164, a rear idler 166, and a plurality of track rollers 168. The drive sprocket 162 includes a plurality of sprocket teeth 163 that engage a pin, illustrated below, of the first track assembly 160. The track chain assembly 160 includes a plurality of ground-engaging track shoes 170 for engaging the ground, or other surface, and propelling the machine 100. During a typical operation of the undercarriage 120, the drive sprocket 162 is driven in a forward rotational direction FR. When rotating in the forward rotational direction FR, the sprocket teeth 163 of the drive sprocket 162 cause the drive the track chain assembly 160 to move forward in direction F. Thus, moving the machine 100 also in the forward direction F. In some examples, the drive sprockets 162 of the undercarriage 120 can be independently operated to turn the machine 100. As the sprocket teeth 163 engage and move the track chain assembly 160, wear and tear may occur on the various parts of the track chain assembly 160.

Figure 2:
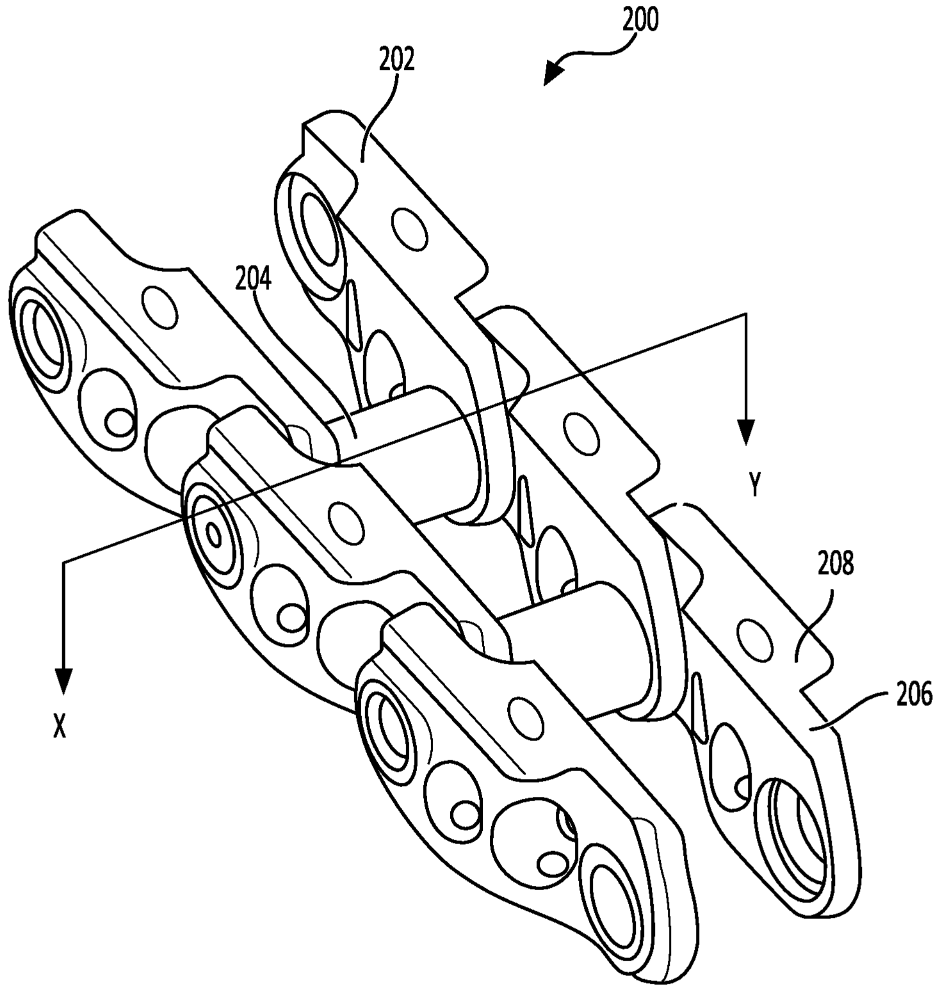
FIG. 2 is a schematic illustration of an example portion of a track chain assembly for an undercarriage of an example track-type machine, according to example embodiments of the disclosure.

FIG. 2 is an illustration of an example portion 200 of a track chain assembly 160 for an undercarriage of an example track-type machine 100 as depicted in FIG. 1, according to example embodiments of the disclosure. As discussed above, when operated, a drive sprocket 162 of the track-type machine 100 may rotate the track assembly 160 about one or more idlers or other guiding components, such as the front idler 164, a rear idler 166, and a plurality of track rollers 168, to facilitate movement of the machine 100. The track assembly 160 may further include a series of links 202 that may be joined to each other by a laterally disposed track pin 204.

As shown, the links 202 may be offset links. That is, each of the links 202 may have an inwardly offset end 206 and an outwardly offset end 208, though the presently disclosed subject matter is not limited to the offsetting configuration of the links 202. The inwardly offset end 206 of each of the links 202 are joined to the respective outwardly offset end 208 of each of the adjacent links. In addition, the inwardly offset end 206 of each of the links 202 may be joined to the inwardly offset end 206 of the opposing link, and the outwardly offset end 208 of each of the links 202 may be joined to the outwardly offset end 208 of the opposing link by the track pin 204. It should be understood, however, that links 202 need not be offset links. Rather, in some embodiments, the links 202 may include inner links and outer links. In such embodiments, both ends of each opposing pair of inner links are positioned between ends of opposing outer links.

The track pin 204 of the presently disclosed subject matter does not comprise or use a bushing. The track pin 204, rather, is constructed of a unitary piece of metal having dimensions similar to a conventional track pin/bushing combination. Various types of steel may be used and include, but are not limited to, medium carbon steels generally containing 0.30% to 0.60% carbon, and high carbon steels generally containing generally 0.60% to >1.00% carbon. Some examples of medium carbon steel that may be used include, but are not limited to, GB-45B or GB40Cr. If using high carbon steel, the track pin 204 may be formed from 52100 steel with a carbon content of greater than 0.9% by weight, such as between approximately 0.95% and 1.1% carbon by weight. In some example embodiments, the carbon content of the track pin 204, as formed and prior to any hardening and/or tempering treatments, may be greater than approximately 1.1% carbon by weight, and in some cases, as high as 2% carbon by weight. Other elements present in the steel may include, but is not limited to, cobalt (Co), molybdenum (Mo), nickel (Ni), titanium (Ti), tungsten (W), niobium (Nb), vanadium (V), combinations thereof, and the like. It should be noted that other types of hardenable steel for the track pin 204 may be used and are considered to be within the scope of the presently disclosed subject matter.

In alternative examples, the track pin 204 may be made of medium carbon or high carbon steel with additional processing as disclosed herein. In these embodiments, the carbon content of the track pin 204 may lie approximately between 0.3 and 0.8% carbon by weight. In some cases, the track pin 204, as formed and prior to any hardening and/or tempering treatments, may be between approximately 0.6% and 0.8% carbon by weight. The track pin 204 steel may further include other elements therein, such as manganese (Mn), phosphorus (P), sulfur (S), silicon (Si), chromium, and/or other materials. For example, the steel, prior to any hardening and/or tempering treatments, may include between approximately 0.1% and 0.6% Mn by weight, between approximately 0% and 0.1% P by weight, between approximately 0% and 0.1% S by weight, between approximately 0.1% and 0.5% Si by weight, and/or between approximately 0.6% and 3% Cr by weight. The track pin 204 may undergo various forging and hardening processes that result in a track pin 204 having a differential hardness across the diameter of the track pin 204, illustrated in FIG. 3.

Figure 3:
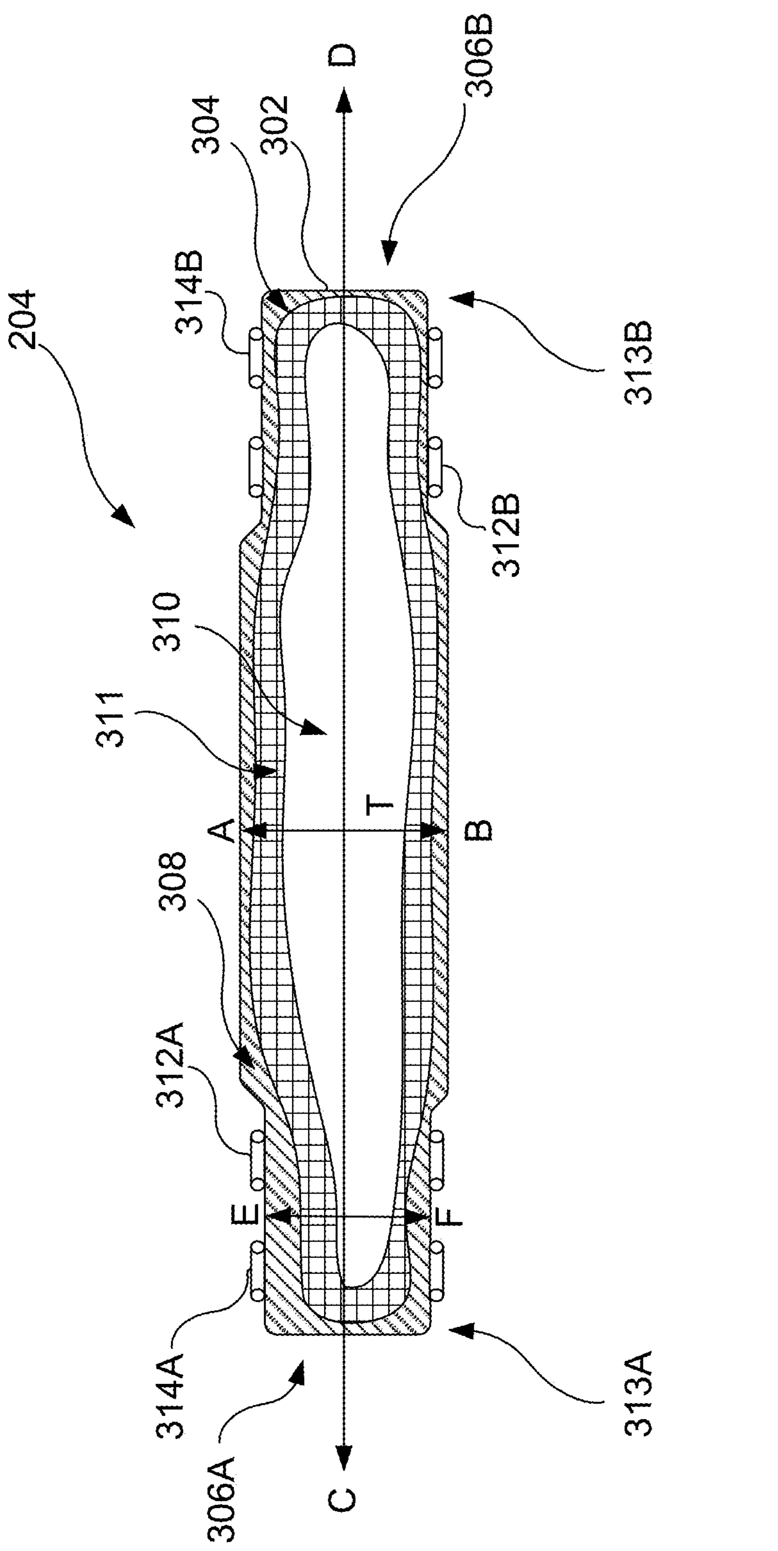
FIG. 3 is a cross-sectional side view of a track pin showing various hardness levels within the inner structure of the track pin, in accordance with various embodiments of the presently disclosed subject matter.

FIG. 3 is a cross-sectional side view of the track pin 204, taken across the cutline XY illustrated in FIG. 2, showing various hardness levels within the inner structure of the track pin 204, in accordance with various embodiments of the presently disclosed subject matter. In FIG. 3, the track pin 204 includes an outer surface 302 and an inner core 304 within the outer surface 302. Diameter AB extends from a first part of the outer surface 302 to a distal part of the track pin 204. Center axis CD extends from track pin end 306A to track pin end 306B through the middle T of the diameter AB.

According to example embodiments of the disclosure, the track pin 204, after formation, may be subject to various thermal treatments that provide for a hardened outer layer of the track pin 204 while providing for a relatively softer inner layer or core. This process may lead to the formation of hardened steel at a region near the outer surface 302 of the track pin 204, while a core region may be softer and more ductile, leading to improved wear resistance and toughness. Thus, the inner portions of the track pin 204 may have a mostly martensitic and/or austenitic crystal structure and the outer portions of the track pin 204 may have a mostly martensite crystal structure. It should be noted, however, that other crystalline structures, like cementitic, may be used and are considered to be within the scope of the presently disclosed subject matter.

For example, a first layer 308 proximate to and including the outer surface 302 can be hardened to a Rockwell (HRC) hardness in a range from 50 to 70, and in some examples, in a range from 55 to 65. It should be noted that the use of the term "layer" is not an intent to define a specific boundary between one or more layers, but rather, a general region having generally similar properties (i.e., transitional rather than discrete). The first layer 308 can extend in thickness from the outer surface 302 to approximately 10 mm within the inner core 304, although various thicknesses of the first layer 308 can be used. Further, the track pin 204 also includes a relatively softer second layer 310 located proximate to and generally surrounding the axis CD. The second layer 310 can be hardened to an HRC in a range from 20 to 40, and in some examples, in a range from 25 to 35. The track pin 204 may further include one or more transitional layers between the first layer 308 and the second layer 310. For example, the track pin 204 includes a third layer 311 having a hardness between the hardness of the first layer 308 and the second layer 310.

To use the track pin 204 in one or more of the links 202 of the track chain assembly 160, the track pin 204 may also include bearings 312A and 312B. The bearing 312A is located proximate to distal end 313A of the track pin 204 and the bearing 312B is located proximate to the distal end 313B of the track pin 204. The bearings 312A and 312B provide the mating surface between the track pin 204 and the links 202 into which the track pins 204 are inserted. In some examples, the bearings 312A and 312Ba are sealed composite bearings. In some examples, a composite bearing is a bearing made from a combination of materials such as a resin reinforced with fiber, and this may also include friction reducing lubricants and ingredients. It should be noted, however, that the presently disclosed subject matter is not limited to any particular type of bearing, the use of a bearing, or the type of mating between the track pin 204 and the link 202. For example, the track pin 204 may be rotatable separate from and in relation to the link 202. In other examples, the track pin 204 may be rotatably fixed to the link 202. In further examples, the track pin 204 may also include second bearings 314A and 314B.

In some examples, the unitary nature of the track pin 204 construction may provide for various dimensions. In one example, a range of a ratio between the diameter AB (i.e., a center diameter) and a diameter EF (i.e., a distal end 313A/B diameter) may be from 1.00 to 1.6, and in some examples, 1.05 to 1.5. For example, if the diameter EF is 3 inches, the diameter AB may range from 3.15 inches to 4.5 inches.

Figure 4:
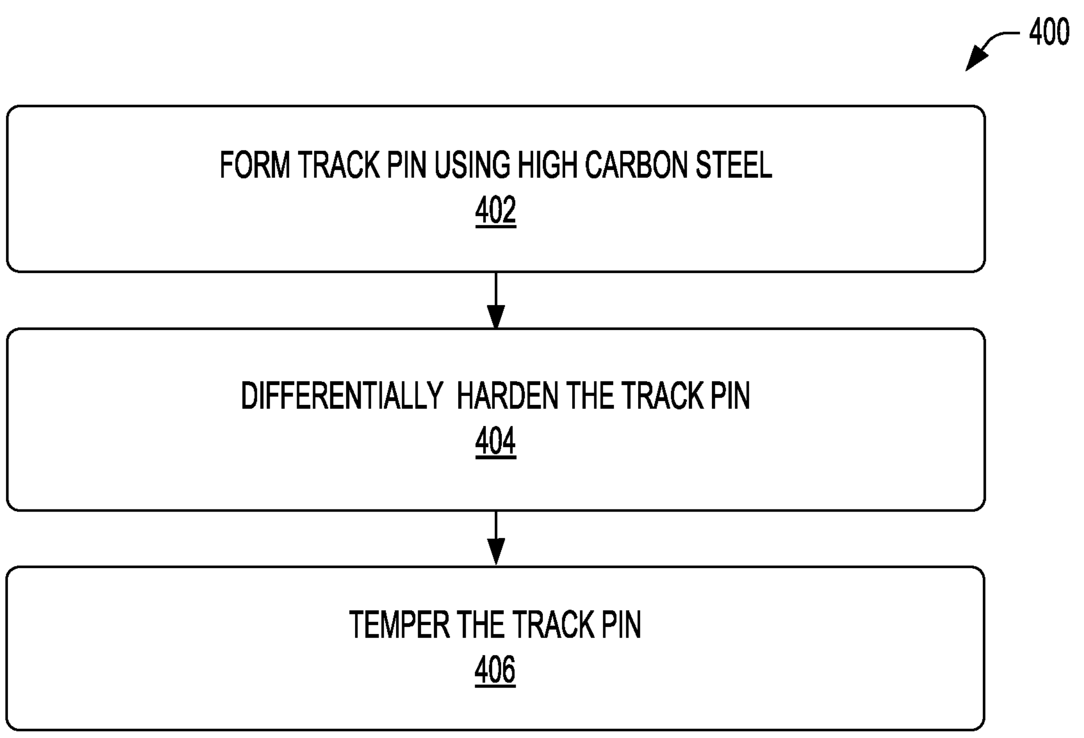
FIG. 4 is a flow diagram depicting an example process for forming a track pin, in accordance with various examples of the presently disclosed subject matter.

FIG. 4 is a flow diagram depicting an example method 400 for forming the track pin 204 of FIGS. 2 and 3, in accordance with various examples of the presently disclosed subject matter. The method 400 may be performed using high-carbon steel, as discussed herein, in a substantially martensite structure. In example embodiments, the starting steel may be medium carbon steel such as GB-45B or GB40Cr, or high carbon steel such as 52100 steel, or other similar medium or high carbon steel.

At operation 402, the track pin 204 may be formed from medium carbon steel such as GB-45B or GB40Cr, or high carbon steel such as 52100 steel. Formation of the track pin 204 may include any variety of machining techniques suitable for forming the track pin 204. For example, any type of forging, shaping, turning, milling, drilling, grinding, and/or other machining techniques may be used to form the track pin 204 into a desired shape.

At operation 404, a differential hardening of the track pin 204 is performed. The differential hardening processing may be performed by heating the track pin 204 to a higher temperature than eutectic temperature. This direct hardening may be performed in any suitable furnace, such as an induction furnace or a gas furnace. In some cases, this direct hardening process may be a batch process, where more than one track pin 204 may be hardened simultaneously.

The furnace process may be performed at any suitable temperature and time. For example, the furnace process may be performed at greater than 800° C. for predetermined time. In some example embodiments, the furnace process may be performed in a temperature range from about 800° C. to about 950° C. for a time range of about 30 minutes to about 3 hours. For example, the furnace heating process of the direct hardening may be performed at 850° C. for 60 minutes. After performing the furnace process, the track pin 204 may be quenched, such as in oil. Alternatively, the quenching process may be in any suitable medium, such as a salt bath, air, and/or water.

In some examples, the track pin 204 is heated at a rate so that the first layer 308 achieves a temperature suitable for hardening, whereby the temperature of the second layer 310 is only increased to a temperature suitable for either a lower hardness when quenched or relatively no change in hardness, thus retaining the relatively softer inner core while creating the hardened outer surface. Various technologies may be used. The temperature of the furnace, and the time in which the track pin 204 is heated, depends on various factors such as, but not limited to, the thickness of the track pin 204, the heat conductivity of the track pin 204, and the desired thickness of the first layer 308. A relatively high temperature for a short period may be used to create a lower thickness of the first layer 308, whereas a relatively higher temperature for a long period may be used to create a higher thickness of the first layer 308.

At operation 406, the track pin 204 is tempered. The track pin 204 is reheated to approximately 300° C. to about 550° C., depending on the steel type, for a time range of about 30 minutes to about 3 hours. In some examples, an optional induction hardening process may thereafter be performed on the inner surface. The hardening on the inner surface may harden the outer portion while tempering the core portion of the track pin. Other hardening and tempering processes may be used to achieve a desired relative hardness between the core and the outer layer.

INDUSTRIAL APPLICABILITY

The present disclosure describes systems, apparatus, and methods for a track pin 204 having increased wear tolerance. In conventional systems, a track pin will include a bushing that is disposed around the outer surface of the track pin. The bushing receives the force of the impact and use from the track mechanism. However, during use, the bushing can deform, crack, or fall off of the track pin, resulting in a reduction in the efficiency or usefulness of the track system. The presently disclosed subject matter discloses a track pin 204 forged from a single piece of steel without using a bushing. The track pin 204 is differentially hardened so that an outer layer of the track pin 204 has the hardness needed for use with the track system while maintaining a relatively softer core to absorb shocks. Further, because the track pin 204 is constructed from a single piece of steel, the interface between a bushing and a track pin of conventional systems is removed. The removal of the interface provides for an improved impact and force absorption throughout the track pin 204 by the use of the differential hardening. In this manner, force impacts do not stop or "compress" at the interface, but rather, are absorbed throughout the track pin 204.

As a result of the systems, apparatus, and methods described herein, the track pins 204 may have a greater lifetime. This reduces field downtime, reduces the frequency of servicing and maintenance, and overall reduces the cost of heavy equipment, such as track-type machines 100. The improved reliability and reduced field-level downtime also improves the user experience such that the machine 100 can be devoted to its intended purpose for longer times and for an overall greater percentage of its lifetime. Improved machine 100 uptime and reduced scheduled maintenance may allow for more efficient deployment of resources (e.g., fewer, but more reliable machines 100 at a construction site). Thus, the technologies disclosed herein improve the efficiency of project resources (e.g., construction resources, mining resources, etc.), provide greater uptime of project resources, and improves the financial performance of project resources. Further, in some examples, the unitary construction of the track pin 204 can provide further weight and material use savings. In conventional pin/bushing applications, with a separate bushing, a certain amount of wall thickness is needed to prevent the bushing from cracking when a sprocket pushes on it. By having a unitary construction, the sprocket pushes against a solid piece of metal and can reduce the potential of that failure mode. During construction, in some examples, the sprocket diameter (portion of the pin the sprocket acts on) cab be able to be smaller, and as a result, the track link can also be downsized.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A track chain assembly comprising:

a first link and a second link; and a track pin joining the first link to the second link, the track pin having a unitary construction, wherein a first length of the track pin has a substantially constant first diameter and a second length of the track pin has a substantially constant second diameter, the track pin comprising:

a first layer having a thickness up to 10 mm, the first layer having a first hardness within an HRC range from 50 HRC to 70 HRC;

a second layer having a second hardness that is less than the first hardness, wherein the track pin excludes an interface with a bushing;

a first sealed composite bearing coupled to the first length of the track pin at a first end of the track pin;

a second sealed composite bearing coupled to the first length of the track pin at the first end of the track pin;

a third sealed composite bearing coupled to the second length of the track pin at a second end of the track pin; and a fourth sealed composite bearing coupled to the second length of the track pin at the second end of the track pin.

2. The track chain assembly of claim 1, wherein the second hardness is within an HRC range from 25 HRC to 35 HRC.

3. The track chain assembly of claim 1, wherein the second layer has a substantially martensite crystal structure.

4. The track chain assembly of claim 1, wherein the first layer has a substantially martensitic crystal structure.

5. The track chain assembly of claim 1, wherein the track pin comprises GB-45B steel, GB-40CR steel, or 52100 steel.

6. The track chain assembly of claim 1, further comprising a third layer disposed between the first layer and the second layer, the third layer having a hardness between the hardness of the first layer and the hardness of the second layer.

7. A method for producing a track pin, the method comprising:

forming the track pin having a unitary construction using a high carbon steel, wherein the track pin excludes an interface with a bushing, wherein a first length of the track pin has a substantially constant first diameter and a second length of the track pin has a substantially constant second diameter;

differentially hardening the track pin to form:

a first layer having a thickness up to 10 mm, the first layer having a first hardness within an HRC range from 50 HRC to 70 HRC;

a second layer having a second hardness less than the first hardness; and coupling:

a first sealed composite bearing to the first length of the track pin at a first end of the track pin;

a second sealed composite bearing to the first length of the track pin at the first end of the track pin;

a third sealed composite bearing to the second length of the track pin at a second end of the track pin; and a fourth sealed composite bearing to the second length of the track pin at the second end of the track pin.

8. The method of claim 7, wherein the high carbon steel comprises 52100 steel.

9. The method of claim 7, wherein performing the differential hardening comprises:

heating the track pin to at least 800° C. for a predetermined period of time; and quenching the track pin.

10. The method of claim 7, wherein the second layer has a hardness less than 52 HRC.

11. The method of claim 7, wherein the differential hardening further forms a third layer disposed between the first layer and the second layer, the third layer having a hardness between the hardness of the first layer and the hardness of the second layer.

12. The method of claim 7, wherein forming the track pin comprises forging, shaping, turning, milling, drilling, or grinding the high carbon steel into a desired shape.

13. A track pin having a unitary construction, comprising:

a first length having a substantially constant first diameter;

a second length having a substantially constant second diameter a first layer having a thickness up to 10 mm, the first layer having a first hardness within an HRC range from 50 HRC to 70 HRC;

a second layer having a second hardness with a second hardness less than the first hardness, wherein the track pin excludes an interface with a bushing;

a first sealed composite bearing coupled to the first length of the track pin at a first end of the track pin;

a second sealed composite bearing coupled to the first length of the track pin at the first end of the track pin;

a third sealed composite bearing coupled to the second length of the track pin at a second end of the track pin; and a fourth sealed composite bearing coupled to the second length of the track pin at the second end of the track pin.

14. The track pin of claim 13, wherein the second hardness is within an HRC range from 25 HRC to 35 HRC.

15. The track pin of claim 13, wherein the second layer has a substantially martensite crystal structure.

16. The track pin of claim 13, wherein the first layer has a substantially martensitic crystal structure.

17. The track pin of claim 13, wherein the track pin comprises GB-45B steel, GB-40CR steel, or 52100 steel.

18. The track pin of claim 13, wherein a range of a ratio between a center diameter and a distal end diameter is from 1.05 to 1.5.

* * * * *